US007663626B2

(12) United States Patent
Rexroad et al.

(10) Patent No.: US 7,663,626 B2
(45) Date of Patent: Feb. 16, 2010

(54) METHOD AND APPARATUS FOR PROVIDING A NETWORK TRAFFIC COMPOSITE GRAPH

(75) Inventors: Carl Brian Rexroad, Oak Ridge, NJ (US); Duncan Sparrell, Chester, NJ (US)

(73) Assignee: AT&T Corp., New York, NY (US)

( * ) Notice: Subject to any disclaimer, the term of this patent is extended or adjusted under 35 U.S.C. 154(b) by 322 days.

(21) Appl. No.: 11/364,969

(22) Filed: Feb. 28, 2006

(65) Prior Publication Data

US 2007/0204034 A1   Aug. 30, 2007

(51) Int. Cl.
*G06T 11/20* (2006.01)
(52) U.S. Cl. .................. 345/440; 715/734; 715/736
(58) Field of Classification Search ............ 714/57; 715/734, 736; 345/440
See application file for complete search history.

(56) References Cited

U.S. PATENT DOCUMENTS

| | | | |
|---|---|---|---|
| 5,961,598 A | 10/1999 | Sime | |
| 5,987,442 A * | 11/1999 | Lewis et al. ................ | 706/10 |
| 6,108,310 A * | 8/2000 | Wilkinson et al. .......... | 370/252 |
| 6,137,782 A * | 10/2000 | Sharon et al. ............... | 370/255 |
| 6,269,330 B1 * | 7/2001 | Cidon et al. ................ | 714/43 |
| 6,449,350 B1 * | 9/2002 | Cox ........................... | 379/134 |
| 6,499,034 B1 * | 12/2002 | Mackinlay .................. | 707/102 |
| 6,578,077 B1 * | 6/2003 | Rakoshitz et al. .......... | 709/224 |
| 6,785,240 B1 * | 8/2004 | Cao et al. ................... | 370/238 |
| 6,829,220 B1 * | 12/2004 | Thorup et al. .............. | 370/235 |
| 6,873,600 B1 * | 3/2005 | Duffield et al. ............. | 370/252 |
| 6,975,963 B2 * | 12/2005 | Hamilton et al. ............ | 702/182 |
| 7,274,661 B2 * | 9/2007 | Harrell et al. ............... | 370/229 |
| 2003/0031129 A1 * | 2/2003 | Dutkiewicz ................. | 370/230 |
| 2003/0086425 A1 * | 5/2003 | Bearden et al. ............. | 370/392 |
| 2003/0097439 A1 * | 5/2003 | Strayer et al. .............. | 709/224 |
| 2004/0059827 A1 * | 3/2004 | Chiang et al. .............. | 709/235 |
| 2004/0142658 A1 * | 7/2004 | McKenna et al. .......... | 455/11.1 |
| 2004/0228277 A1 | 11/2004 | Williams | |
| 2005/0039086 A1 * | 2/2005 | Krishnamurthy et al. .... | 714/57 |
| 2005/0188028 A1 * | 8/2005 | Brown et al. ................ | 709/206 |
| 2005/0286434 A1 * | 12/2005 | McKee et al. .............. | 370/252 |
| 2006/0098579 A1 * | 5/2006 | Chang et al. ............... | 370/242 |
| 2007/0081543 A1 * | 4/2007 | Brenes et al. .............. | 370/401 |
| 2007/0169001 A1 * | 7/2007 | Raghunath et al. ......... | 717/130 |

OTHER PUBLICATIONS

PCT Search Report and Written Opinion for PCT/US2007/005358; consists of 11 unnumbered pages.

* cited by examiner

*Primary Examiner*—William L Bashore
*Assistant Examiner*—Gregory A Distefano (57) ABSTRACT

A method and apparatus for providing network traffic composite graphs for packet networks are disclosed. The graph enables analysts to visually determine the relative size of an event in relation to other traffic activity. For example, a user or a network analyst creates categories of applications for the river-chart graph and optionally enters a weight factor for each of the application categories. The method then gathers records for flows, number of bytes (or packets), etc. from monitoring device(s) in a predetermined interval. The expected values are determined and composite volumes are calculated for each protocol and/or port. The method then updates the cumulative river-chart bands and the cumulative expected values for historical and predicted time periods in the river-chart graph.

13 Claims, 6 Drawing Sheets

METHOD AND APPARATUS FOR PROVIDING A NETWORK TRAFFIC COMPOSITE GRAPH

The present invention relates generally to communication networks and, more particularly, to a method and apparatus for providing network traffic activity graphs on packet networks such as IPv4, IPv6, or any other network that can be separated into categories or types of data based on protocol and/or port number information (e.g., MPLS, frame relay, ATM).

BACKGROUND OF THE INVENTION

The Internet has emerged as a critical communication infrastructure, carrying traffic for a wide range of important scientific, business and consumer applications. Since Internet services are becoming ubiquitous, more and more businesses and consumers are relying on their Internet connections for both voice and data transport needs. Each component of the network is shared by a large number of businesses and consumers and needs to meet a variety of service quality expectations. For example, network service providers and enterprise network operators need to monitor the network for security purposes. Large volume of network data is gathered to identify relevant events for analysis. However, the volume of traffic is constantly changing. In addition, some traffic types represent much larger proportion of the packets traversing the network. Security events don't always affect all traffic types in the same way or to the same extent. For example, network worms can cause a significant increase in communication attempts and generally a lesser increase in the number of bytes transported. This type of security event may be more significant in terms of impact on the customers and may not be large enough to register in an overall traffic volume measurement.

Therefore, there is a need for a method that provides a traffic composite graph that provides relative size of an event in relation to other traffic activity and expected traffic activity volumes.

SUMMARY OF THE INVENTION

In one embodiment, the present invention discloses a method and apparatus for providing a network traffic composite graph. The graph enables analysts to visually determine the relative size of an event in relation to other traffic activity. For example, a network operator, network analyst, or other user creates categories of applications for the river-chart graph and optionally enters a weight factor for each of the application categories. The method then gathers records for flows, number of bytes (or packets), etc. from monitoring device(s) within a predetermined interval. The expected values are determined and composite volumes are calculated for each protocol and/or port. In one embodiment, the composite volume is determined by multiplying the number of flows by the number of bytes. The method then updates the cumulative river-chart bands and the cumulative expected values for historical and predicted time periods in the river-chart graph.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a graphical depiction of traffic activity on packet networks such as IPv4 & IPv6. Although the present invention is discussed below in the context of IP networks, the present invention is not so limited. Namely, the present invention can be applied for other networks.

Figure 1:
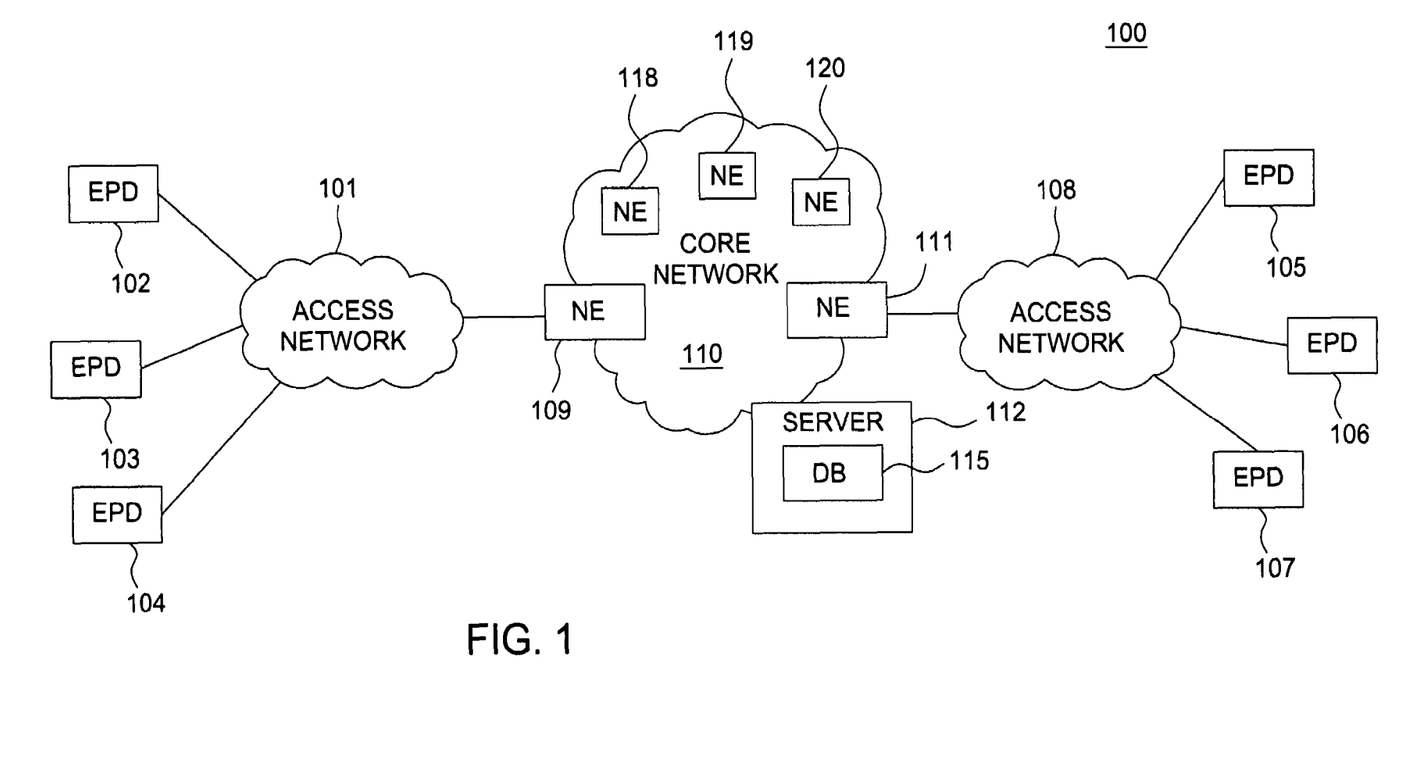
FIG. 1 illustrates an exemplary network related to the present invention.

FIG. 1 is a block diagram depicting an exemplary configuration of a communication system 100 constructed in accordance with one or more aspects of the invention. A plurality of endpoint devices 102-104 are configured for communication with the core packet network 110 via an access network 101. Similarly, a plurality of endpoint devices 105-107 are configured for communication with the core packet network 110 (e.g., an IP based core backbone network supported by a service provider) via an access network 108. The network elements 109 and 111 may serve as gateway servers or edge routers for the network 110. Those skilled in the art will realize that although only six endpoint devices, two access networks, and four network elements (NEs) are depicted in FIG. 1, the communication system 100 may be expanded by including additional endpoint devices, access networks, and border elements without altering the present invention.

The endpoint devices 102-107 may comprise customer endpoint devices such as personal computers, laptop computers, personal digital assistants (PDAs), servers, and the like. The access networks 101 and 108 serve as a means to establish a connection between the endpoint devices 102-107 and the NEs 109 and 111 of the core network 110. The access networks 101, 108 may each comprise a digital subscriber line (DSL) network, a broadband cable access network, a local area network (LAN), a wireless access network (WAN), and the like. Some NEs (e.g., NEs 109 and 111) reside at the edge of the core infrastructure and interface with customer endpoints over various types of access networks. An NE is typically implemented as an edge router, a media gateway, a border element, a firewall, and the like. An NE may also include a component that resides within the network (e.g., NEs 118-120) such as a honeypot, a tarpit, a mail server, or like device. Similarly, an NE is responsible for providing flow data or flows to an application server 112. A flow (or flow data) comprises a set of packets wherein each packet of the flow is characterized by the same source IP (SIP) address, destination IP (DIP) address, source port (sport), destination port (dport), and IP protocol. A flow record may also include information about the number of packets exchanged and number of bytes exchanged in a given flow as well as start time and end time. A flow may also include flag information that indicates the characteristics and status of the flow. Otherwise, various time-out rules are used to define the end of a flow. Notably, the present invention utilizes flow records that are created from the flow activity. The core network 110 also comprises an application server 112 that contains a database 115. The application server 112 may comprise any server or computer that is well known in the art (also see FIG. 5). In one embodiment of the present invention, the server 112 comprises a dedicated application server that is configured to receive and process flow data from the network elements in order to provide a network traffic composite graph. The database 115 may be any type of electronic collection of data that is well known in the art. The database 115 is used by the server 112 to store flow data.

The above IP network is described to provide an illustrative environment in which data are transmitted and networks are monitored. For example, commercial network service providers and enterprise network service providers need to monitor the network for security, performance, and reliability purposes. The network monitoring data is gathered to identify relevant events for analysis. For example, monitoring devices may be utilized to poll the various network elements and to gather data since the volume of traffic is constantly changing and ever growing. In addition, some traffic types represent much larger proportion of the packets traversing the network, e.g., web content applications. Security events do not always affect all traffic types in the same way or to the same extent. For example, network worms can cause a significant increase in communication attempts and a lesser increase in the number of bytes transported. This type of security event may be more significant in terms of impact on the customers and may not be large enough to register in an overall traffic volume measurement.

While network implementers & operators strive to create detection methods that automatically alarm on network anomalies and security events, humans have powerful correlation capabilities and judgment that surpasses even the most complex automated processing. However, humans are an expensive resource. So the objective is to provide graphical illustrations that represent many facets of network activity such that anomalies which may be missed by automated means can be identified with a minimal number of personnel.

To address this criticality, the present invention provides a method and apparatus for providing a network traffic composite graph that indicates the relative size of an event in relation to a baseline expected activity as well as other traffic activity for the period. In order to clearly illustrate the present invention, the following network monitoring concepts will first be described. These concepts are that of:

River-chart graph; and
River-chart band.

River-chart graph refers to a graph that shows traffic volume as a composite of communication attempts (a.k.a. flows) and bytes transported versus time. Volume for some major protocol groups (or broadly defined as application categories) are separated on the graph as river-chart bands as defined below. In one embodiment, expected volume estimates that are based on previous traffic averages are displayed as dashed lines overlaid on the bands (see FIG. 3 below). Significant security relevant events such as network worms, network outages, and world events are identifiable as deviations from normal traffic patterns.

River-chart band refers to separations in the graph depicted in the form of "bands" to help identify the classes of network or computer applications that might be affected. The following list provides some examples of categories of applications:

Web content;
Web Requests;
Peer-to-Peer (P2P);
Messaging;
Infrastructure; and
Other.

"Web content" generally refers to data presented on user screens when browsing the Internet. Normally, this represents the most voluminous traffic on the Internet. Examples are source port 80/TCP (http) and source port 443/TCP (http over SSL) applications. "Web requests" represents the traffic generated due to requests for specific content pages when browsing the Internet. For example packets with destination port 80/TCP (http) & destination port 443/TCP (http over SSL). "Peer-to-Peer" (P2P) represents protocols that support various "peer-to-peer" applications and File Transfer Protocol (FTP). "Messaging" represents protocols that support "mail" and "chat" applications. "Infrastructure" includes routing protocols (e.g., border gateway protocol), name resolution services (e.g., DNS), etc. The "other" category is for the traffic activity that is not included in the above specific categories. In one such embodiment, each river band represents data that is exclusive from data represented in other bands. However, it would be possible to apply the same concept where some categories of data are represented in more than one band. This might be done for emphasis or to accommodate overlap in categories.

The river-chart graph may be designed by the network operator to help network analysts to identify significant changes in network volume that may represent security relevant events. The input data for the graph comes from network monitoring points identified as being relevant, e.g., peering links from the public Internet portion of the network, border elements, etc.

Figure 2:
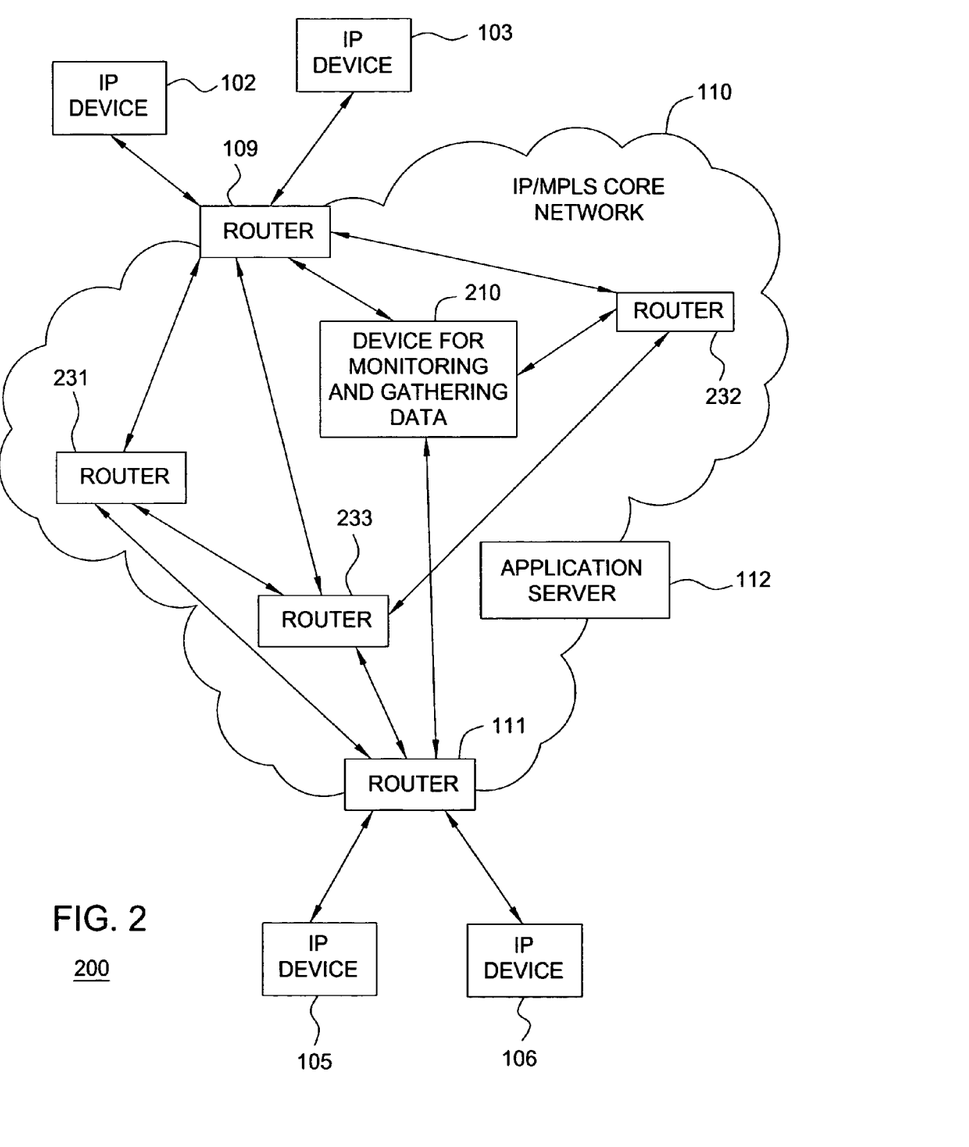
FIG. 2 illustrates an example network with the invention for providing network traffic composite graph.

FIG. 2 illustrates an example network 200 in accordance with one embodiment of the present invention for providing network traffic composite graph. For example, the customers are using the IP devices 102 and 103 to access the IP services. IP devices 102 and 103 are connected to the gateway router 109 located on the IP core network 110. The routers 231, 232 and 233 are part of the core network 110 and are used to route packets to the IP devices 105 and 106. The packets traverse the core network from gateway router 109 to gateway router 111. The packets are then sent to the IP devices 105 and 106 connected to the gateway router 111. Note that only the network elements used to describe the present invention are illustrated in FIG. 2.

In one embodiment, the service provider is monitoring the network and gathering data using device 210. For example, the device is monitoring the traffic and gathering the data by communicating with the gateway routers and other peer networks. However, the data may be gathered/generated using passive monitoring techniques on links between network elements. The data to be gathered is determined by the network analysts. The service provider may implement the present invention for providing the network traffic composite graph in an application server 112. The application server communicates with the monitoring device 210 on a predetermined interval basis to receive updated data. The application server then displays the river-chart graph such that a user, e.g., a network analyst, may view the information and identify security relevant events. Note that the network analyst (user) has access to the application server and the river-chart graph.

The current invention provides a method for providing a network traffic composite graph. The network traffic composite graph is presented as a river-chart graph and enables network security personnel to determine the relative size of an event in relation to other traffic activity. The river-chart graph provides the volume of traffic as a composite of the number of connections (e.g., flows) and the number of bytes (or packets) transmitted versus time.

In one embodiment, the current invention utilizes the equation below to calculate the composite volume:

$$\text{Composite Volume} = K_a * (s\text{flows} + d\text{flows}) * (s\text{bytes} + d\text{bytes})$$

Where, K is a scaling constant for the respective applications (subscript "a") to be displayed. The scaling constant is empirically adjusted to allow each of the bands to be adjusted for relative importance and prominence on the network. For example, since web traffic is so significant in size, a K factor between 0-1 is used to reduce the prominence on the graph (e.g., 0.1). Since "infrastructure" protocols represent a relatively small amount of traffic volume and since this traffic is critical to the continued function of the network, and K factor many greater than 1 is used (e.g., 10).

In the above equation, "sflow" and "dflow" represent the number of connection for sources and destinations (i.e., to and from clients or servers) while "sbytes" and "dbytes" represent the number of bytes for a source and destination, respectively. The product of the number of connections and number of bytes is used in the above equation to determine the composite volume. The resulting composite volume is affected by the changes in communication attempts as well as the changes in the number of bytes (or packets) transported. The composite volume then creates an exaggeration effect that makes subtle changes in the traffic profile readily visible in the river-chart graph. If an exaggeration effect is not desirable for the chart, the root of the product terms may be used to restore linearity to the scale, e.g., composite value=K*sqrt((sflows+dflows)*(sbytes+dbytes)).

Figure 3:
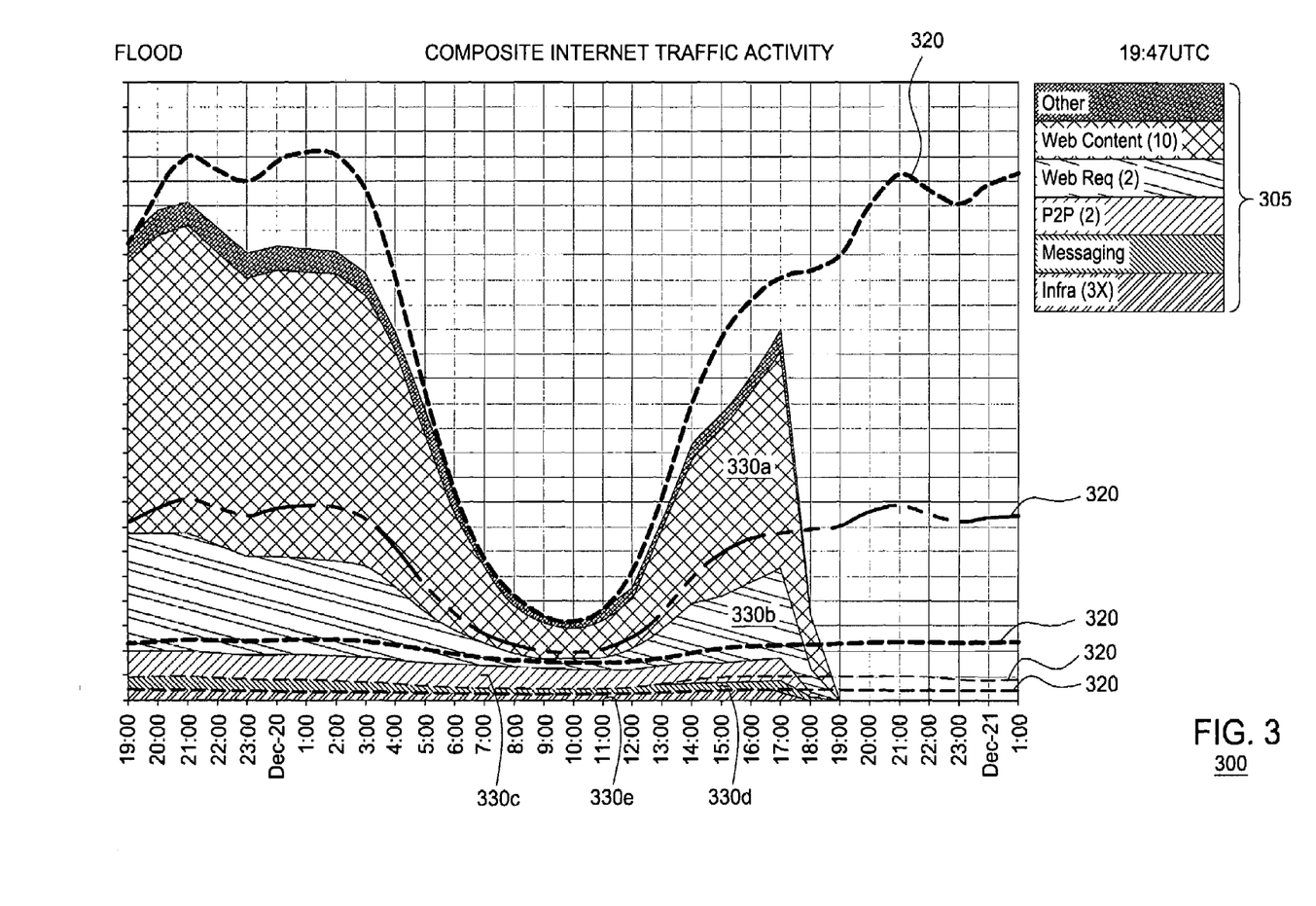
FIG. 3 illustrates a snapshot of a composite river-chart graph using UTC time scale in hourly time intervals updated every ten minutes.

FIG. 3 illustrates a snapshot of a composite river-chart graph 300 using Universal Time Coordinated (UTC) time scale in hourly time intervals updated every ten minutes. In one embodiment, the composite volume is provided on a rotating hourly scale that shows twenty-four hours into the past and six hours into the future. The time scale for international standard for tracking Internet events is Universal Time Coordinated (UTC). The service provider can selectively determine the intervals for the time scales used for the river-chart graph and the intervals for updating the data based on the needs of the network analysts. For example, the data for a prior time interval (e.g., the past twenty-four hours) includes the composite traffic volume with expected traffic volume overlays (e.g., shown as dashed lines 320). Namely, the data for a future time interval (e.g., the future six hours) shows predicted traffic volume for each of the application categories. However, some application categories may not have a predicted traffic volume, e.g., such as the application category "other" shown in FIG. 3. The traffic volume denoted at a specific time represents the traffic from the displayed hour to the next hour. For example, the value presented at 1200 UTC on the river-chart graph represents traffic activity that was transported from 1200 UTC to 1300 UTC.

Some traffic types represent a much larger volume in number of bytes transported than other types. The method of the present invention utilizes multiplier factors, "K" factors in the equation above, combined with the values to balance the relative size of the bands. For example, a band that has very little traffic is multiplied in size to make a more prominent band on the graphic display. Similarly, a band that has a large amount of traffic (e.g., Web Content) is divided by a factor to decrease the size of the band. The magnification may be indicated in the legend 305 of the river-chart graph. An example of a notation to indicate the magnification is "×10" to indicate multiplication by 10, and "/10" to indicate division by 10.

Expected traffic values are generated by studying historical patterns of the traffic. For example, the expected traffic values in FIG. 3 are generated by evaluating the average value for the same-hour-of-day and same-day-of-week over a predefined period of historical time, e.g., the previous six weeks, dropping the highest and lowest values, and then calculating the average of the remaining four values. The averaging method is used to make sure the current traffic values are not compared to previous anomalous measurements. The river-chart graph may indicate either an increase or a decrease in volume when anomalous events occur. While this embodiment uses a simple moving average with high and low values dropped to establish a baseline, other embodiments may use other methods for baseline prediction such as exponential moving average. FIG. 3 illustrates the Web Request 330b, Web Content 330a, P2P category 330c, messaging category 330d and infrastructure category 330e as river-chart bands.

Some examples of events that may increase the volume are network worms, distributed denial of service attacks, regional or world wide events, health of other service provider's network, etc. Network worms typically cause a significant increase in network communication attempts and lesser increase in total number of bytes transported. A Distributed Denial of Service (DDoS) attack may cause an increase in communication attempts and/or byte traffic. Most DoS attacks are not large enough to register in an overall byte traffic volume measurement. However, the derogatory effect from the customer's perspective may be significant. World events such as natural disasters (including those that may affect other service providers) may increase the traffic volume. Some examples of events that may decrease the volume are network outage, maintenance activity, etc.

Figure 6:
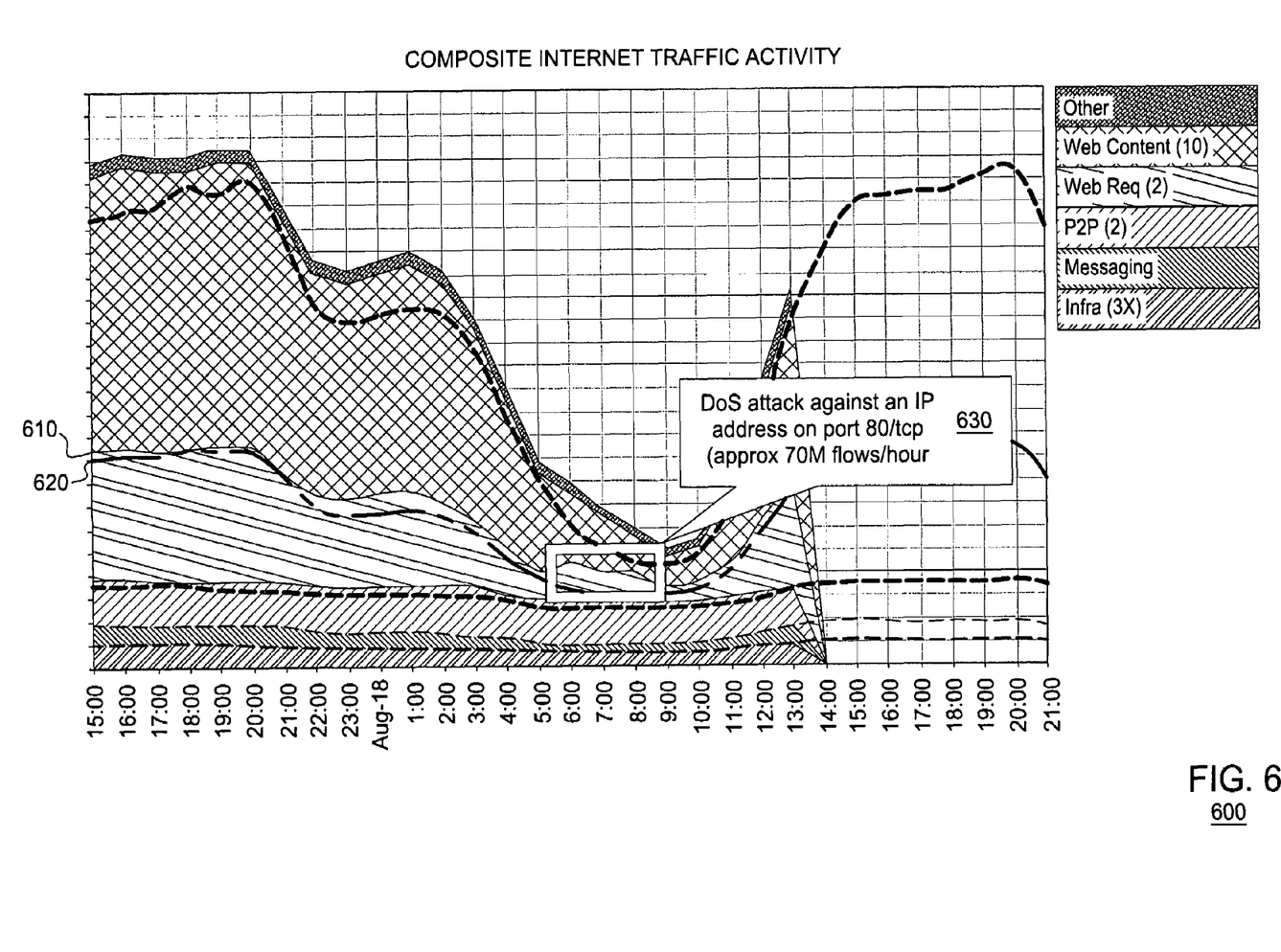
FIG. 6 illustrates a denial of service attack event.

For example, FIG. 6 illustrates a denial of service attack event 630 where a deviation from normal traffic pattern occurs between 5:00 and 9:00 UTC that affected web requests. The expected traffic as indicated by line 620 is significantly below the river-chart band 610.

In one embodiment, the network operator may also provide a drill-down (more detailed) graph for each of the river-chart traffic bands on the composite river-chart graph. Each drill-down graphic provides further break-down of the data and enables spikes on the composite river-chart graph, such as shown in 630, to be investigated easily by the network analysts. For example, for the river-chart graphs in FIG. 3 and FIG. 6, a drill-down graph for P2P, messaging, infrastructure, other, etc. may be provided.

Figure 4:
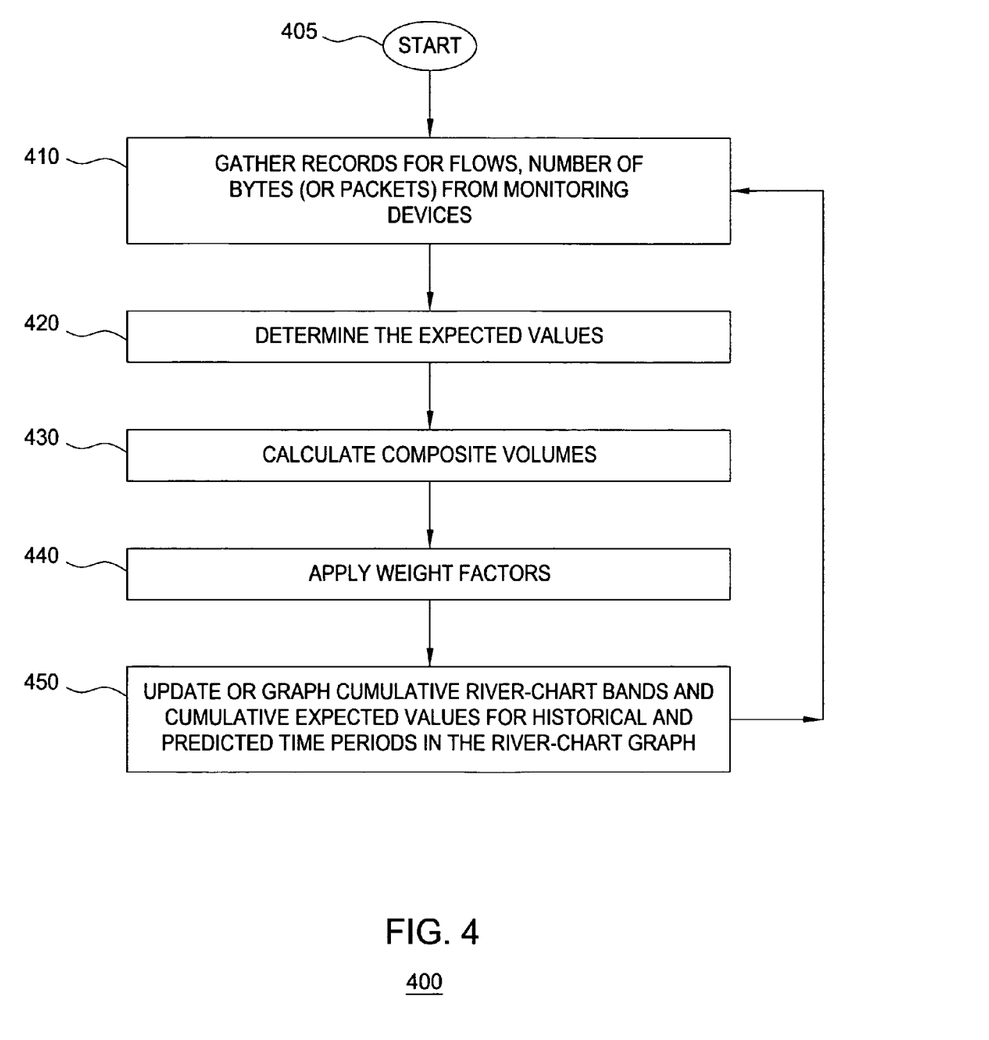
FIG. 4 illustrates a flowchart of a method for providing network traffic composite graphs.

FIG. 4 illustrates a flowchart of a method 400 for providing network traffic composite graph. For example, the service provider may implement the present invention for providing network traffic composite graphs in an application server. For example, a user or a network analyst creates categories of applications for the graph and enters respective weight factors for each of the applications. The weight factors are set to prevent the activity from prominent traffic types, e.g., web traffic, from overwhelming lower volume applications and masking relevant events.

Method 400 starts in step 405 and proceeds to step 410. In step 410, method 400 gathers traffic data, e.g., records for flows, number of bytes (or packets) from monitoring device(s) at a predetermined interval. For example, the application server may query the monitoring device every 10 minutes. The method then proceeds to step 420.

In step 420, method 400 determines the expected values for each of the categories. The expected values may be determined by various methods that study traffic patterns. In one embodiment, the current invention generates the expected traffic values by evaluating the average value for the samehour-of-day and same-day-of-week over a predefined period of historical time, e.g., the previous six weeks, and dropping the highest and lowest values, and then calculating the average of the remaining four values.

In step 430, method 400 calculates composite volumes for each protocol and/or port. The composite volume is determined by multiplying the number of flows by the number of bytes (or packets). The service provider may also include other parameters such as packet counts in the product calculation.

In step 440, method 400 applies the weight factors. The weight factors are selected to enable the users to visually observe subtle changes in traffic and detect relevant security events. The method then proceeds to step 450 to plot the river-chart bands.

In step 450, method 400 updates the cumulative river-chart bands and the cumulative expected values for historical and predicted time periods. For example, the river-chart bands may be displayed for the current time along with an overlay of the expected values for 24 hours in to the past and 6 hours in to the future. Method 400 then returns to step 410 to gather more data and the steps of 420-450 are repeated for the next cycle of updating the river-chart graph.

Although the above description focuses on an embodiment that separates bands by applications/ports, other embodiments of the invention may use river bands in terms of other network attributes rather than applications/ports. Examples include:

geographical regions (north, south, east, west, state, country, etc)

logical regions of the network (e.g., access interfaces, peering interfaces, and core transport)

customer categories (e.g., large businesses, small businesses, consumer dial-up, consumer broadband)

for purpose of homeland security, critical infrastructure sectors (e.g., financial, defense, etc)

Figure 5:
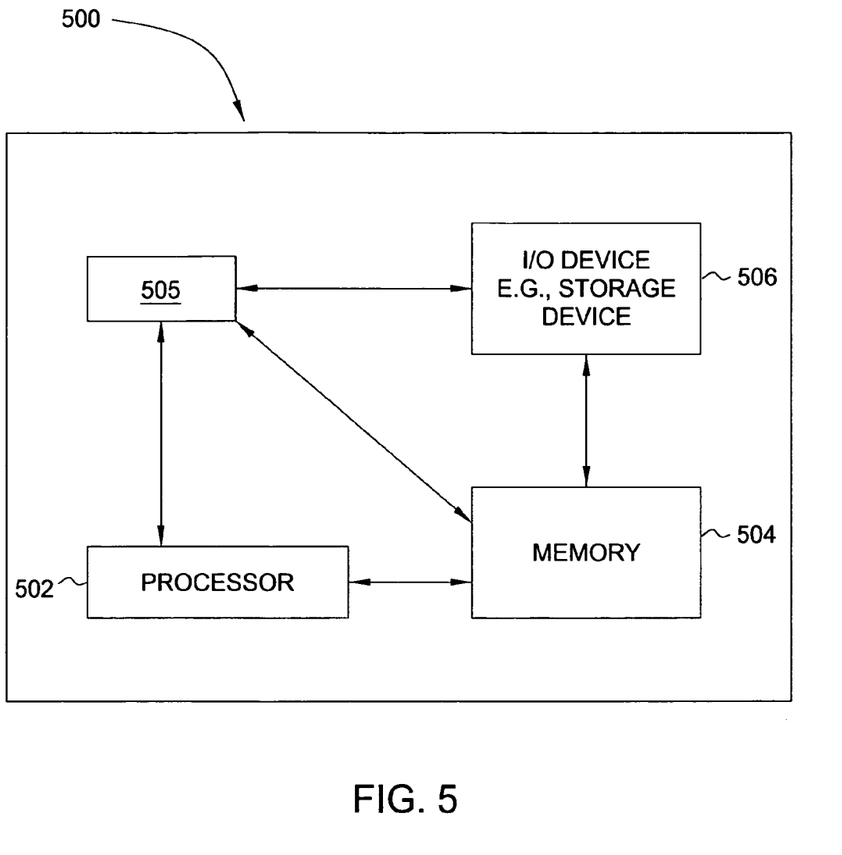
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing network traffic composite graphs, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 505 for providing network traffic composite graphs can be loaded into memory 504 and executed by processor 502 to implement the functions as discussed above. As such, the present method 505 for providing network traffic composite graphs (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for graphing network traffic for a communication network, comprising:

defining a plurality of application categories;

gathering traffic data from at least one network element of said communication network, wherein said gathering comprises gathering records relating to a plurality of flows and a plurality of bytes or packets, wherein said plurality of flows and said plurality of bytes or packets are used to calculate a composite volume, wherein said composite volume is determined by multiplying a number of said plurality of flows by a number of said plurality of bytes or packets, and wherein said composite volume is calculated in accordance with:

$$\text{Composite Volume} = K_a \times (s\text{flows} + d\text{flows}) \times (s\text{bytes} + d\text{bytes})$$

where sflow represents a number of connection for sources, where dflow represents a number of connection for destinations, where sbytes represents a number of bytes for a source and where dbytes represents a number of bytes for a destination and $K_a$ is a scaling factor for an application "a";

determining an expected traffic value for at least one of said plurality of application categories; and plotting by a processor said traffic data associated with each of said plurality of application categories as a band in a composite river-chart graph, where said expected traffic value for at least one of said plurality of application categories is also plotted in said composite river-chart graph.

2. The method of claim 1, wherein said plurality of application categories comprises at least two of: a web request application category, a web content application category, a peer-to-peer application category, a messaging application category or an infrastructure application category.

3. The method of claim 1, further comprising:

applying at least one weight factor to at least one of said plurality of application categories.

4. The method of claim 1, wherein said composite volume is calculated for at least one of: a protocol or a port.

5. The method of claim 1, wherein said expected traffic value is generated by evaluating an average value for a predefined period of historical time associated with at least one of said plurality of application categories.

6. The method of claim 5, wherein said average value is generated from a plurality of corresponding values for a same-hour-of-day and a same-day-of-week over said predefined period of historical time.

7. The method of claim 1, wherein said composite river-chart graph illustrates said traffic data over a prior time interval, and said composite river-chart graph illustrates said expected traffic value for at least one of said plurality of application categories over a future time interval.

8. A computer-readable medium having stored thereon a plurality of instructions, the plurality of instructions including instructions which, when executed by a processor, cause the processor to perform the steps of a method for graphing network traffic for a communication network, comprising:

defining a plurality of application categories;

gathering traffic data from at least one network element of said communication network, wherein said gathering comprises gathering records relating to a plurality of flows and a plurality of bytes or packets, wherein said plurality of flows and said plurality of bytes or packets are used to calculate a composite volume, wherein said composite volume is determined by multiplying a number of said plurality of flows by a number of said plurality of bytes or packets, and wherein said composite volume is calculated in accordance with:

$$\text{Composite Volume} = K_a \times (s\text{flows} + d\text{flows}) \times (s\text{bytes} + d\text{bytes})$$

where sflow represents a number of connection for sources, where dflow represents a number of connection for destinations, where sbytes represents a number of bytes for a source and where dbytes represents a number of bytes for a destination and $K_a$ is a scaling factor for an application "a";

determining an expected traffic value for at least one of said plurality of application categories; and plotting said traffic data associated with each of said plurality of application categories as a band in a composite river-chart graph, where said expected traffic value for at least one of said plurality of application categories is also plotted in said composite river-chart graph.

9. The computer-readable medium of claim 8, further comprising:

applying at least one weight factor to at least one of said plurality of application categories.

10. The computer-readable medium of claim 8, wherein said composite volume is calculated for at least one of: a protocol or a port.

11. The computer-readable medium of claim 8, wherein said expected traffic value is generated by evaluating an average value for a predefined period of historical time associated with at least one of said plurality of application categories.

12. The computer-readable medium of claim 8, wherein said composite river-chart graph illustrates said traffic data over a prior time interval, and said composite river-chart graph illustrates said expected traffic value for at least one of said plurality of application categories over a future time interval.

13. An apparatus for graphing network traffic for a communication network, comprising:

means for defining a plurality of application categories;

means for gathering traffic data from at least one network element of said communication network, wherein said means for gathering traffic data comprises means for gathering records relating to a plurality of flows and a plurality of bytes or packets, wherein said plurality of flows and said plurality of bytes or packets are used to calculate a composite volume, wherein said composite volume is determined by multiplying a number of said plurality of flows by a number of said plurality of bytes or packets, and wherein said composite volume is calculated in accordance with:

$$\text{Composite Volume} = K_a \times (s\text{flows} + d\text{flows}) \times (s\text{bytes} + d\text{bytes})$$

where sflow represents a number of connection for sources, where dflow represents a number of connection for destinations, where sbytes represents a number of bytes for a source and where dbytes represents a number of bytes for a destination and $K_a$ is a scaling factor for an application "a";

means for determining an expected traffic value for at least one of said plurality of application categories; and means for plotting said traffic data associated with each of said plurality of application categories as a band in a composite river-chart graph, where said expected traffic value for at least one of said plurality of application categories is also plotted in said composite river-chart graph.

* * * * *